US005895665A

United States Patent [19]
Irastorza

[11] Patent Number: 5,895,665
[45] Date of Patent: Apr. 20, 1999

[54] POWDERED STONE MINERAL SUPPLEMENT

[76] Inventor: Ray Irastorza, 35 Johnson Ave., Thunder Bay, Ontario, Canada, P7B-2V8

[21] Appl. No.: 08/865,132

[22] Filed: May 29, 1997

[51] Int. Cl.$^6$ ........................................................ A61K 9/14
[52] U.S. Cl. ............................ 424/489; 424/400; 424/600
[58] Field of Search ...................... 424/400, 489, 424/600

[56] References Cited

U.S. PATENT DOCUMENTS 4,528,200  7/1985  Coleman ..................................... 426/74
4,670,248  6/1987  Schricker ................................... 424/19

Primary Examiner—Thurman K. Page
Assistant Examiner—James M. Spear
Attorney, Agent, or Firm—Jones, Tullar & Cooper, P.C.

[57] ABSTRACT

The invention comprises comminution of certain types of stone to prepare a composition adapted to promote health and vitality in mammals, including humans. The stone is selected from sedimentary rock, igneous rock, metamorphosed sedimentary or igneous rock and combinations thereof.

6 Claims, No Drawings

POWDERED STONE MINERAL SUPPLEMENT

BACKGROUND OF THE INVENTION

This invention relates to a preparation for the promotion of mammalian health. In particular, the invention relates to the use of sedimentary or igneous rock for the preparation of a mineral supplement conducive to the promotion and maintenance of good health and vitality in humans.

Minerals are essential to all life. In suitable dosages, minerals further protect health in mammals and improve resistance to disease and other ailments. It would therefore be very advantageous to identify an abundant and inexpensive source of these essential elements.

It has been found that comminuted sedimentary or igneous rock is a bountiful source of minerals which can promote good health and vitality in humans. A significant advantage of the subject invention is the abundant source of the raw material.

SUMMARY OF THE INVENTION

Accordingly, the present invention comprises comminuted sedimentary or igneous rock for use as a mineral supplement. Additional embodiments include stone selected from metamorphosed sedimentary or igneous rock and mixtures of the two.

DETAILED DESCRIPTION

The subject invention embodies the discovery that comminuted sedimentary or igneous rock provides mineral supplements which enhance health and vitality in mammals including humans. A significant advantage of the invention is the abundant availability of the starting material required to work the invention.

The invention may be practised with sedimentary or igneous rock. It has been discovered that these stones or mixtures thereof yield a particularly effective mineral supplement when comminuted and taken internally. Metamorphosed igneous rock and metamorphosed sedimentary rock and mixtures thereof are also suitable for use in the invention.

Any suitable means may be adopted to convert the stone into powdered form. The comminuted stone must be sterilized. Sterilization may be effected by any acceptable means including oven heating to over 100° C. or autoclaving. To ensure complete disinfection, the powdered sterilized product may also be mixed with a suitable antibiotic.

The powdered stone is adapted for oral administration. The invention may be introduced into the alimentary canal in admixture with food products or directly in capsule or pill form.

Dosage will vary with the general health of the subject. Typically preparations of the invention may be consumed in amounts of about ½ a teaspoon per individual. Frequency of consumption will also vary with the health of the subject. Typically the frequency of ingestion will vary from once per day to once per week.

There are no known adverse side effects of internal consumption of preparations of the invention.

PREPARATION

A mixture of equal amounts of sedimentary and igneous rock were ground into a fine powder. The powder was sterilized by exposure to oven heating at a temperature greater than 100° C.

EXAMPLE 1

A human subject ingested approximately ½ a teaspoon per day of a powder prepared according to the invention for a period of 3 months. The preparation was consumed in admixture with food. After the 3 month period, the subject reported improved health and vitality. The improvement in health was verified by a medical practitioner. No adverse ill-effects were observed.

EXAMPLE 2

Three human subjects ingested approximately ½ a teaspoon of a powder prepared according to the invention. After 2–3 hours, the subjects reported enhanced vitality.

I claim:

1. A method of enhancing health and vitality in a mammal, comprising the steps of: comminuting stone in admixture with an antibiotic, the stone being selected from the group consisting of sedimentary rock, igneous rock, metamorphosed sedimentary rock, metamorphosed igneous rock and mixtures thereof; and orally ingesting the comminuted stone.

2. A health supplement for humans, comprising an admixture of stone and an antibiotic, the stone being selected from the group consisting of sedimentary rock, igneous rock, metamorphosed sedimentary rock, metamorphosed igneous rock and mixtures thereof.

3. A method of enhancing health and vitality in a human, comprising the steps of: comminuting stone selected from the group consisting of sedimentary rock, igneous rock, metamorphosed sedimentary rock, metamorphosed igneous rock and mixtures thereof; sterilizing the comminuted rock by heating at a temperature greater than 100° C.; allowing the heated comminuted rock to cool; and orally ingesting the cooled comminuted rock.

4. A method of enhancing health and vitality in a human, comprising the steps of: comminuting stone selected from the group consisting of sedimentary rock, igneous rock, metamorphosed sedimentary rock, metamorphosed igneous rock and mixtures thereof; admixing the comminuted rock with an antibiotic; sterilizing the admixture by heating at a temperature greater than 100° C.; allowing the heated admixture to cool; and orally ingesting the cooled admixture.

5. A health supplement for mammals in admixture with an antibiotic, the health supplement comprising, comminuted stone selected from the group consisting of sedimentary rock, igneous rock, metamorphosed sedimentary rock, metamorphosed igneous rock and mixtures thereof.

6. A vitalizing agent in mammals in admixture with an antibiotic, the vitalizing agent comprising, comminuted stone, selected from the group consisting of sedimentary rock, igneous rock, metamoprhosed sedimentary rock, metamorphosed igneous rock and mixtures thereof.

* * * * *